(12) United States Patent
Ibrahim et al.

(10) Patent No.: US 7,620,177 B2
(45) Date of Patent: Nov. 17, 2009

(54) SECURE PRINTING

(75) Inventors: Wael M. Ibrahim, Cypress, TX (US); David J. Grimme, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 843 days.

(21) Appl. No.: 11/263,475

(22) Filed: Oct. 31, 2005

(65) Prior Publication Data

US 2007/0098161 A1    May 3, 2007

(51) Int. Cl.
*G09C 3/00*    (2006.01)

(52) U.S. Cl. .......................................... 380/55

(58) Field of Classification Search ................... 380/55, 380/51, 246; 713/189, 193; 726/26, 30
See application file for complete search history.

(56) References Cited

U.S. PATENT DOCUMENTS

| | | | |
|---|---|---|---|
| 6,751,732 B2 | 6/2004 | Strobel et al. | |
| 6,862,583 B1 | 3/2005 | Mazzagatte et al. | |
| 6,977,745 B2 * | 12/2005 | Sharma | 358/1.15 |
| 2002/0016921 A1 | 2/2002 | Olsen et al. | |
| 2002/0194307 A1 * | 12/2002 | Anderson et al. | 709/219 |
| 2003/0007172 A1 | 1/2003 | Takayanagi | |
| 2003/0011810 A1 | 1/2003 | Strobel et al. | |
| 2003/0081247 A1 * | 5/2003 | Sharma | 358/1.15 |
| 2003/0099353 A1 * | 5/2003 | Goh et al. | 380/51 |
| 2004/0117655 A1 * | 6/2004 | Someshwar | 713/201 |
| 2004/0186925 A1 * | 9/2004 | Cooper et al. | 710/8 |
| 2004/0218207 A1 | 11/2004 | Biundo et al. | |
| 2005/0084113 A1 | 4/2005 | Simpson et al. | |
| 2007/0030961 A1 * | 2/2007 | Mizutani et al. | 380/30 |
| 2008/0201784 A1 * | 8/2008 | Someshwar | 726/28 |

* cited by examiner

*Primary Examiner*—Beemnet W Dada
(74) *Attorney, Agent, or Firm*—Nathan R. Rieth

(57) ABSTRACT

A system and methods provides secure end-to-end printing in networked computing environments, such as a corporate office environment employing a number of shared printers. The described system and methods are applicable in various scenarios to provide an enhanced solution for secure printing.

32 Claims, 5 Drawing Sheets

SECURE PRINTING

BACKGROUND

Current office computing environments employing shared printers over a local area network (LAN), for example, can leave print data unprotected against unauthorized capture, viewing, alteration, duplication, etc., by unintended recipients. Current applications do not restrict print privileges, for example, by requiring secure printing. Thus, office computing environments can expose print files to risk at various points, such as when the files are on a user's storage device, on the network, in the printer's memory, or after they have been printed in hard copy form.

In addition, the proliferation of wireless networks and printers exposes the print data to even easier passive sniffing than is experienced on wired networks. Packet sniffing utilities have been around since the original release of Ethernet, and they allow data to be captured as it is transmitted over a network. Although packet sniffers are commonly used to help diagnose network problems, they are also regularly used for malicious purposes to capture unencrypted data within network traffic, such as passwords and usernames in so called "passive man in the middle" attacks. Such captured data can then further enable a malicious user to gain access to a system or network.

Printers are also subject to spoofing and interception in so called "active man in the middle" attacks, where another party can receive a file, view and save the file, and then route the file back to the printer. In such cases, an attacker exploits the weakness that a printer does not currently need to be authenticated and masquerades as an intended file recipient in order to intercept a file. Intercepted files can then be modified before being routed back to the printer and printed, or they can be printed multiple times without logging who printed them.

BRIEF DESCRIPTION OF THE DRAWINGS

The same reference numerals are used throughout the drawings to reference like components and features.

DETAILED DESCRIPTION

Introduction

The following discussion is directed to a system and methods for providing secure end-to-end printing in networked computing environments, such as a corporate office environment employing a number of shared printers. The described system and methods are applicable in various scenarios to provide an enhanced solution for secure printing. For example, secure end-to-end printing is provided in typical scenarios in which a user generates a document on a computer using an application program, and then sends that document to a secure printer for printing. In another example, secure end-to-end printing is provided in scenarios in which a user wants to control the distribution and security of a sensitive email and/or email attachment.

The system and methods provide for the authentication of the user, the specific computer, and the specific printer in a given printing transaction. Print data is protected throughout its lifetime, from the computer of origin, through the network, within the destination printer, and after the data has been printed. The system ensures timely retrieval of printed output by the intended recipient, and provides for logging the delivery of the output and for non-repudiation of such delivery by the recipient. User identity is verified through an authentication token, such as a smart card, and hardware such as a Trusted Platform Module (TPM) provides system and printer authentication, and facilitates encryption through protection of an encryption key. Print data is protected by hardware encryption, while printed output is protected and logged through secure bins that are locked and controlled by the printer and unlocked only by the authorized user.

Exemplary Environment

Figure 1:
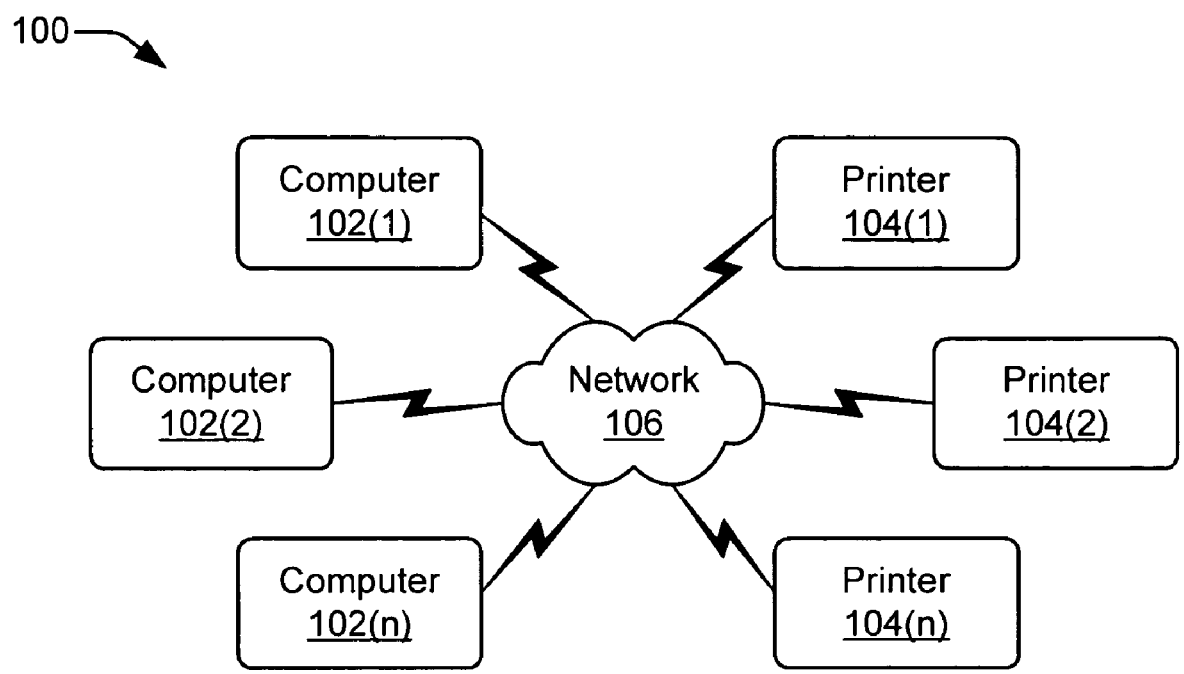
FIG. 1 illustrates a block diagram of an exemplary embodiment of a network printing environment that is suitable for implementing secure end-to-end printing.

FIG. 1 illustrates a block diagram of an exemplary network printing environment 100 that is suitable for implementing secure end-to-end printing as described herein. The exemplary network printing environment 100 includes computers 102 and printers 104 operably coupled to one another via a network 106. Network 106 can include both local and remote connections and is intended to represent any of a variety of conventional network topologies and types (including optical, wired and/or wireless networks), employing any of a variety of conventional network protocols (including public and/or proprietary protocols). Thus, network 106 may include, for example, any one or a combination of a modem, a cable modem, a LAN (local area network), a WAN (wide area network), an intranet, the Internet, a USB cable, or any other suitable communication link.

A computer 102 may be implemented as any of various devices having the appropriate computing capacity for enabling a user to manipulate or otherwise prepare in electronic form, an image or document to be rendered as an image that is printed or otherwise formed onto a print medium by a printer 104 after transmission over network 106. Computer 102 is otherwise typically capable of performing common computing functions, such as email, calendaring, task organization, word processing, Web browsing, and so on. In this embodiment, computer 102 runs an open platform operating system, such as the Windows® brand operating systems from Microsoft®. Computer 102 may be implemented, for example, as any of a variety of conventional computing devices, including desktop personal computers (PCs), notebook or portable computers, workstations, mainframe computers, Internet appliances, handheld PCs, combinations thereof, and so on.

A printer 104 may be implemented as any of a variety of printing devices capable of receiving print data in a printer friendly format (e.g., PostScript or printer control language (PCL)) from a computer 102 via network 106 and rendering the print data as a hard copy image document formed on various print media including, for example, paper, transparencies, glossy photo paper, envelopes, labels and the like. A printer 104 is often a device that is peripheral to a general purpose computer 102, but it can also be a stand-alone device shared by various computers 102 coupled through network 106. Printers 104 may include various devices such as laser printers, inkjet printers, dot matrix printers, dry medium printers, plotter and the like. Another example of a printer 104 may include a multifunction peripheral (MFP) device which combines a printing function with another related function such as a scanning function, a copying function, a facsimile function, or different combinations thereof. One or more of printers 104 are secure printers that include security features such as a plurality of locking output bins, a security token ID reader, and an embedded Trusted Platform Module (TPM) which facilitate secure end-to-end printing as further described herein below.

EXEMPLARY EMBODIMENTS

Figure 2:
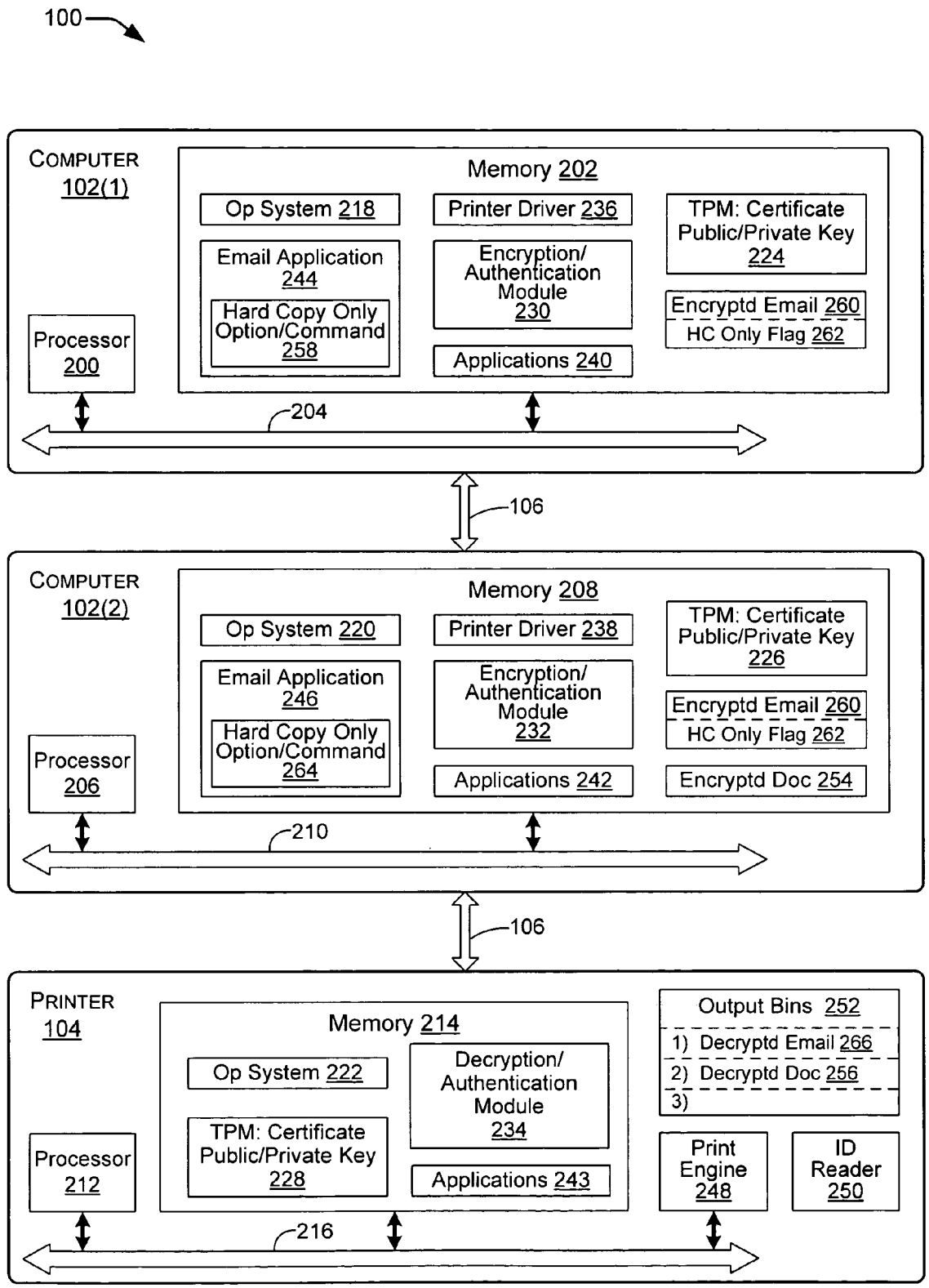
FIG. 2 illustrates a more detailed block diagram of an exemplary embodiment of a network printing environment that is suitable for implementing secure end-to-end printing.

FIG. 2 illustrates a more detailed block diagram of an exemplary embodiment of a network printing environment 100 that is suitable for implementing secure end-to-end printing as described herein. In FIG. 2, two computers 102(1) and 102(2), and a printer 104 are operatively coupled to one another via network 106. Although computer 102(1) is coupled to computer 102(2), and computer 102(2) is in turn coupled to printer 104, this configuration is provided for purposes of discussion only, and is not intended to indicate that other configurations are not present or possible. For example, computers 102(1) and 102(2), and printer 104 are all coupled via network 106, and they are therefore also all coupled directly to one another, as is apparent from the network printing environment 100 shown in FIG. 1.

Computers 102(1), 102(2) and printer 104 each include a processor and memory (200, 206, 212 and 202, 208, 214 respectively), both of which are coupled to a local interface (204, 210, 216 respectively). The local interface (204, 210, 216) may be, for example, a data bus with an accompanying control/address bus, as can be appreciated by those skilled in the art. Various components (e.g., application programs, modules, data) are stored within each of the memories (202, 208, 214) and are executable by respective processors (200, 206, 212).

In general, the term "executable" means a program file that is in a form that can ultimately be run by the respective processors 200, 206 and 212. Examples of executable programs include a compiled program that can be translated into machine code in a format that can be loaded into a random access portion of the memories 202, 208 and 214, and run by the respective processors 200, 206 and 212, or source code that may be expressed in proper format such as object code that is capable of being loaded into a random access portion of the memories 202, 208 and 214, and executed by the respective processors 200, 206 and 212. An executable program may be stored in any portion or component of each of the memories 202, 208 and 214 including, for example, random access memory, read-only memory, a hard drive, compact disk (CD), floppy disk, or other memory components.

In this respect, each of the memories 202, 208 and 214 is defined herein as both volatile and nonvolatile memory as well as data storage components. Volatile components are those that do not retain data values upon loss of power. Nonvolatile components are those that retain data upon a loss of power. Thus, each of the memories 202, 208 and 214 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 200, 206 and 212 may represent multiple processors and each of the memories 202, 208 and 214 may represent multiple memories that operate in parallel processing circuits, respectively. In such a case, each of the local interfaces 204, 210 and 216 may be an appropriate network that facilitates communication between any two of the multiple processors, between any processor and any of the memories, or between any two of the memories. Processors 200, 206 and 212 may be of electrical or optical construction, or of some other construction, as can be appreciated by those of ordinary skill in the art.

In addition to executable and other components discussed herein, computers 102 may include various peripheral devices (not shown) such as, for example, keyboards, keypads, touch pads, touch screens, microphones, a mouse, joysticks, or one or more push buttons, and so on. Such peripheral devices may also include display devices, indicator lights, speakers, and the like.

Examples of components stored within memories 202, 208 and 214, and executable by respective processors 200, 206 and 212, include operating systems 218, 220 and 222. Each of the operating systems 218, 220 and 222, executes in general to control the allocation and usage of hardware resources such as the memory, processing time and peripheral devices, with respect to computers 102 and printer 104. In this manner, each of the operating systems 218, 220 and 222 serves as the foundation on which various components and applications depend as is generally known by those with ordinary skill in the art.

Other components stored in memories 202, 208 and 214, and executable by respective processors 200, 206 and 212, include Trusted Platform Modules (TPM) 224, 226, and 228, and encryption or decryption authentication modules 230, 232, and 234, respectively. The Trusted Platform Module (TPM) itself is well-known to those skilled in the art, and it will therefore not be described here in great detail. In general, the TPM improves platform security by protecting encryption and signature keys at times when the keys are being used in an unencrypted form. TPM protects symmetric encryption keys, in a process known as "key wrapping", as well as platform and user authentication information against software-based attacks. Computer memories 202 and 208 additionally include, respectively, print drivers 236, 238, and various application programs 240, 242, such as email applications 244 and 246.

Printer 104 also includes print engine 248 that performs the actual printing of a document or forming of an image onto a print medium. Processor 212 generally processes image/document data from a computer 102 and manages printer 104 functions through control of print engine 248. In the embodiment of FIG. 2, printer 104 is configured as a secure printer and additionally includes an identification (ID) reader 250 for reading a user's authentication token, and a plurality of locked output bins 252 for temporary storage and retrieval of secure documents, as is discussed further below.

Referring now to computer 102(2) of FIG. 2, in one exemplary implementation of secure end-to-end printing a user running an application 242, such as a word processing application, may select a secure print option from within the application 242 in order to generate a secure hard-copy document on printer 104. A print command from application 242 initiates printer driver 238, which receives the application print data from application 242 and converts it into a printer friendly format such as PostScript or printer control language (PCL). The secure print command further initiates the encryption/authentication module 232 which encrypts the formatted print data from printer driver 238 (e.g., as encrypted document 254) using a public key from Trusted Platform Modules (TPM) 226 that matches the private key of the TPM 228 on printer 104. In order for the encrypted document 254 to be able to print on printer 104, the printer 104 is first authenticated by means of a strong authentication method. The strong authentication is a challenge-response type authentication through the encryption/authentication module 232 to confirm if the printer is an authorized secure printer 104.

Accordingly, in one embodiment, the encryption/authentication module 232 queries, or sends a challenge to, printer 104 to determine if it is a secure printer authorized to print the secure document from computer 102(2). The decryption/authentication module 234 on printer 104 accesses its certificate from the TPM 228 enabled printer, which it uses to respond to the query/challenge. If the response indicates that the attribute certificate of the printer is valid, then the encrypted document 254 is sent over network 106 to secure printer 104. Otherwise, the user receives a message indicating the print command cannot be executed (e.g., because the printer 104 is not an authorized secure printer).

An encrypted document 254 received by an authorized secure printer 104, is decrypted upon receipt by the decryption/authentication module 234 of printer 104, and printed to a locked output bin 252 without delay. That is, when an encrypted document 254 is received, it will only be stored in a memory of printer 104, if at all, as long as is needed to enable decryption/authentication module 234 to retrieve an unencrypted version of a key from TPM 228, with which it will decrypt the encrypted document 254. The print engine 248 then renders the decrypted print data as a hard copy document on a medium (e.g., paper, transparency, photo paper, envelope, etc.) and sends the decrypted hard copy document 256 to a designated locked/secure output bin 252 such as output bin #2 shown on printer 104.

After a decrypted hard copy document 256 is sent to a locked output bin 252, an authorized user (e.g., the user who generated the document on computer 102(2)) can provide proper identification at the secure printer 104 to open the locked output bin and retrieve the decrypted document 256. For example, a user may present an authentication token (e.g., a smart card, electronic badge, fingerprint biometric, retinal pattern biometric, a proximity device such as a Bluetooth cell phone, etc.) to the ID reader 250 which reads the user's identity. The decryption/authentication module 234 then determines if the user's identity is authorized. If the user presents the proper identification, the user is authenticated through the decryption/authentication module 234 and the printer 104 unlocks the associated output bin 252 (i.e., output bin #2 in the present example), permitting the user to retrieve the decrypted document 256. Otherwise, the output bin remains locked.

In another embodiment, the decryption/authentication module 234 may require more than one person's authentication in order to unlock the output bin for retrieval of a decrypted document 256. This is useful in situations, for example, where the document is a will, where the recipients of the document do not trust one another, where all the recipients of a document must receive the information at the same time, and so on.

In addition, after a decrypted hard copy document 256 is sent to a locked output bin 252, the decryption/authentication module 234 can enforce a time limit for retrieving the document that is set by the default policy or by the creator of the document. Thus, a user must provide proper identification at the secure printer 104 to open the locked output bin and retrieve the decrypted document 256 prior to the expiration of the retrieval time limit. If the user does not retrieve the decrypted document 256 from the output bin 252 prior to expiration of the time limit, the decrypted document 256 may be forwarded to a shredding station to be shredded.

Referring now to computer 102(1) of FIG. 2, in another exemplary implementation of secure end-to-end printing, a user running an email application 244 can ensure the security of an email message by selecting a "hard-copy-only" option when sending the email. This security option helps to ensure that only the intended recipient of the email message receives the email. The security option includes preventing the forwarding of the email message, or a legible/unencrypted copy of the email message, to unintended recipients.

In one embodiment, selection of the "hard-copy-only" option/command (e.g., 258, 264) from an email application (e.g., 244, 246 on computers 102(1) and 102(2)) sends an email (encrypted or decrypted based on the sender's choice) directly to a secure printer of the sender's choosing. In this scenario, the hard-copy-only command initiates printer driver 236, which receives the email data from email application 244 and converts it into a printer-friendly format such as PostScript or printer control language (PCL). The hard-copy-only command may further initiate the encryption/authentication module 230 to encrypt the printer-formatted email data using a public key obtained from the certificate of the authenticated secure printer on which the email is authorized to print. In this embodiment, the recipient never receives an electronic version of the email. Rather, the recipient may receive a message from the printer (e.g., sent by an application 243) to pick up an email at an identified output bin of the printer.

In another embodiment, selection of the "hard-copy-only" option/command (e.g., 258, 264) from an email application (e.g., 244, 246 on computers 102(1) and 102(2)) sends an email to an email recipient as an encrypted email 260 that cannot be viewed by the recipient on a computer display device. In one embodiment, selection of the hard-copy-only option sets a flag 262 in the email indicating that the email is a hard-copy-only email. In addition to setting the flag 262, the hard-copy-only command initiates printer driver 236, which receives the email data from email application 244 and converts it into a printer-friendly format such as PostScript or printer control language (PCL). The hard-copy-only command further initiates the encryption/authentication module 230 which encrypts the printer-formatted email data using a public key obtained from the certificate of the authenticated secure printer 104 on which the email is authorized to print.

Referring generally to FIG. 2, a recipient of the hard-copy-only email 260, such as a user running email application 246 on computer 102(2), would see the arrival of the encrypted email 260 in an email inbox. However, the recipient would not be able to view the encrypted email 260 on the computer 102(2) screen. Rather, when the recipient attempts to open and view the encrypted email 260 (e.g., by clicking on the encrypted email 260), the email application 246 discovers the hard-copy-only flag 262 associated with the encrypted email 260, and as a result of the flag, sends the encrypted email 260 to the designated secure printer 104 for decryption and printing as a hard copy of the decrypted email 266. In one embodiment, the email application 246 may provide a message to the user that the email is encrypted and cannot be viewed on the computer display, but that the email has been sent to an identified secure printer 104 for decryption and printing as a hard-copy-only email document. Thus, the email recipient is limited to viewing the encrypted email 260 as a decrypted email 266 in hard-copy form only, after it is printed on secure printer 104.

As with the previous example above regarding use of a secure print option from within a word processing application 242, in order to generate a secure hard-copy document on printer 104, the printer 104 must first be authenticated as an authorized secure printer 104. Thus, when the email recipient at computer 102(2) attempts to open and view the encrypted email 260, after the hard-copy-only flag 262 is discovered, the encryption/authentication module 232 queries, or sends a challenge to printer 104 to determine if it is a secure printer that is authorized to print the secure encrypted email 260 from computer 102(2). The decryption/authentication module 234 on printer 104 retrieves an unencrypted key from TPM 228 which it uses to respond to the query/challenge. If the response indicates the printer is authorized, e.g., through a valid certificate or TCG (Trusted Computing Group) metrics, then the encrypted email 260 is sent over network 106 to the secure printer 104. Otherwise, the email recipient at computer 102(2) receives a message indicating the encrypted email 260 cannot be decrypted and printed (e.g., because the printer 104 is not an authorized secure printer).

An encrypted email 260 received by an authorized secure printer 104, is decrypted upon receipt by the decryption/authentication module 234 of printer 104 and printed to a locked output bin 252 without delay. That is, when an encrypted email 260 is received, it will only be stored in a memory of secure printer 104, if at all, as long as is needed to enable decryption/authentication module 234 to retrieve an unencrypted version of a key from TPM 228, with which it will decrypt the encrypted email 260. The print engine 248 then renders the decrypted email 266 hard copy document on a medium (e.g., paper, transparency, photo paper, envelope, etc.) and sends the decrypted email 266 to a designated locked/secure output bin 252, such as output bin #1 shown on printer 104.

After a hard copy decrypted email 266 is sent to a locked output bin 252, an authorized user (e.g., the email recipient on computer 102(2)) can provide proper identification at the secure printer 104 to open the locked output bin and retrieve the decrypted email 266, in a manner as discussed above. Thus, a user may present an authentication token (e.g., a smart card, electronic badge, fingerprint biometric, retinal pattern biometric, a proximity device such as a Bluetooth cell phone, etc.) to the ID reader 250 which reads the user's identity. The decryption/authentication module 234 then determines if the user's identity is authorized. If the user presents the proper identification, the user is authenticated through the decryption/authentication module 234 and the printer 104 unlocks the associated output bin 252 (i.e., output bin #1 in the present example), permitting the user to retrieve the decrypted email 266. Otherwise, the output bin remains locked.

As noted above, the decryption/authentication module 234 may require more than one person's authentication in order to unlock the output bin for retrieval of a decrypted document 256. This is useful in situations, for example, where the document is a will, where the recipients of the document do not trust one another, where all the recipients of a document must receive the information at the same time, and so on.

In a manner as discussed above, the decryption/authentication module 234 can set a time limit for retrieving the decrypted email 266 from the locked output bin 252. Thus, a user must provide proper identification at the secure printer 104 to open the locked output bin and retrieve the decrypted email 266 prior to the expiration of the retrieval time limit. If the user does not retrieve the decrypted email 266 from the output bin 252 prior to expiration of the time limit, the decrypted email 266 may be forwarded to a shredding station to be shredded.

Once a decrypted email 266 is retrieved from an output bin 252 (e.g., output bin #1, FIG. 2), the decryption/authentication module 234 is further configured to provide a receipt, verifying that the decrypted email 266 has been retrieved by the intended recipient. Thus, a recipient is unable to repudiate receipt of the decrypted email 266. The receipt is sent back to the user who generated the email at computer 102(1), and it may include the date and time the recipient picked up the decrypted email 266, the type of authorization token used by the recipient to provide identification, and so on.

In addition to restricting an email recipient to a hard-copy-only view of a secure email, the hard-copy-only flag 262 protects a secure email from being forwarded to unintended recipients. In one embodiment, an email recipient at computer 102(2) (FIG. 2) who receives an email from computer 102(1), may not be able to forward an encrypted email 260 on to another computer. That is, upon selecting a "forward email" command for an encrypted email 260, the email application 246 discovers the hard-copy-only flag 262 and does not honor the command. In this case, the intended recipient may receive a message on the display screen indicating that the selected email is a secure encrypted email 260, and cannot be forwarded. In another embodiment, the recipient may be able to forward the encrypted email 260 on to an unintended recipient at another computer. However, the authentication features of the TPM would prevent the unintended recipient from printing and/or retrieving the email at the authorized secure printer 104 because the unintended computer would not be an authenticated device, and the unintended recipient does not have the proper identification to unlock the output bin 252 on printer 104 to retrieve a decrypted email 266. Also, for more security, the sender of an email may choose to doubly encrypt the email. First with the printer's public key, then with the recipient's public key. This way even if a recipient forwarded the email to another unauthorized person that person will not be able to decrypt the first encryption, and as a result, the printer will not be able to decrypt the information. However, if this is a feared threat model, then the sender should send the document directly to a secure printer and deprive the recipient of any form of electronic email copy.

Exemplary Methods

Example methods for implementing secure end-to-end printing in a network printing environment 100 such as described above with reference to FIG. 2 will now be described with primary reference to the flow diagrams of FIGS. 3-5. The exemplary methods apply generally to the exemplary embodiments discussed above with respect to FIGS. 1-2. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of computer-readable instructions defined on a computer-readable medium.

Figure 3:
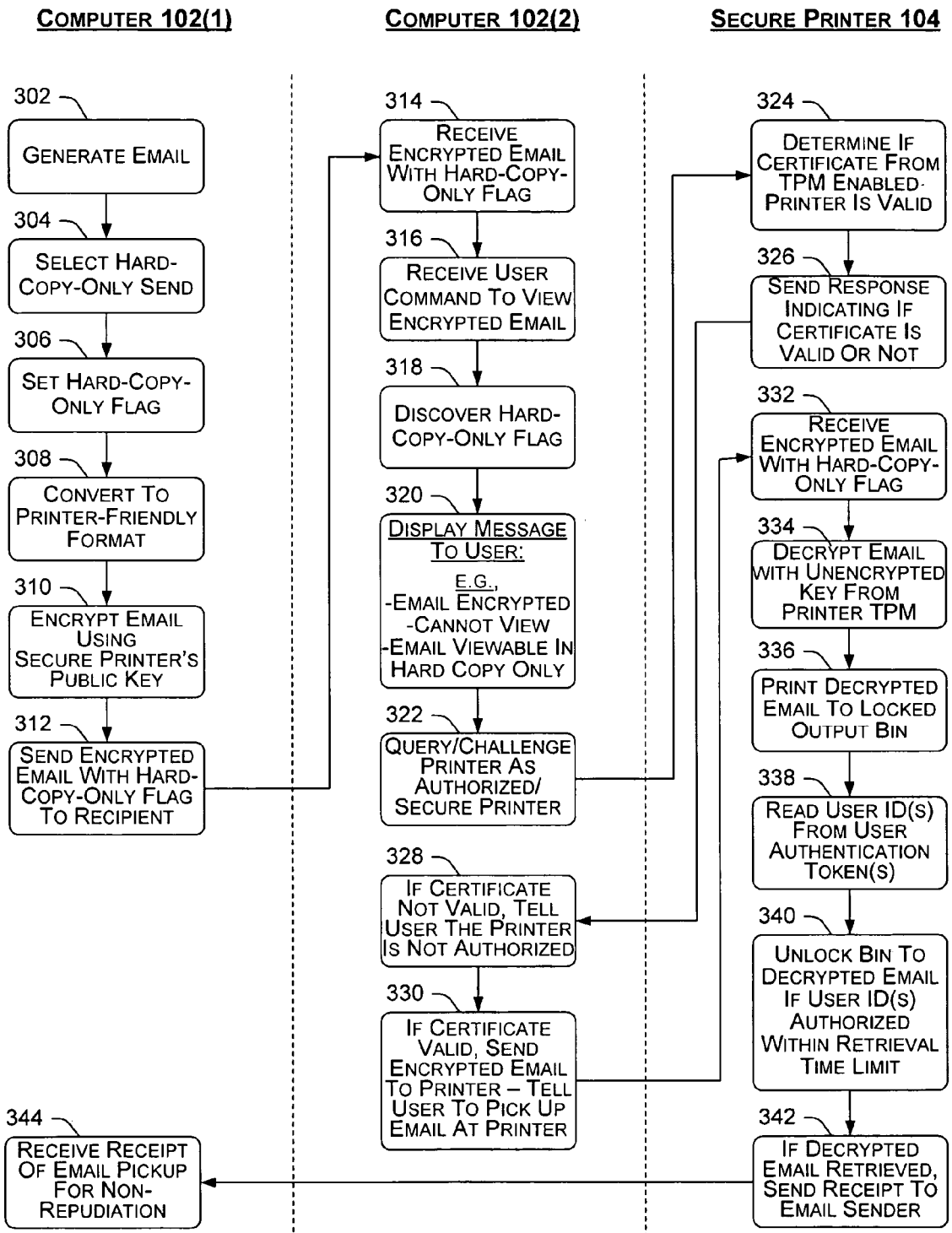
FIGS. 3-5 are flow diagrams illustrating exemplary embodiments of methods for implementing secure end-to-end printing in a network printing environment.

An exemplary method 300, illustrated in FIG. 3, relates to printing secure emails. Exemplary method 300 begins at block 302, with a user generating an email on a computer 102(1). At block 304, the user wants to send the email in a secure manner to a recipient and selects a "hard-copy-only" send option/command. The hard-copy-only command generally ensures that the email, and/or the email attachments, will not be viewable by the recipient on a computer display screen and that the email cannot be forwarded to additional recipients. More specifically, the hard-copy-only command ensures the sender that the recipient can only view the email as a hard-copy document printed on a secure printer.

As shown at block 306, a hard-copy-only flag is set in a field of the email when the hard-copy-only command is selected. The email is converted to a printer-friendly format, such as PostScript or printer control language (PCL) at block 308, and at block 310, the email is encrypted using a public key of the printer on which the email is designated to print. At block 312, the encrypted email, along with its associated hard-copy-only flag, is then sent to the email recipient at another computer, such as to a user at computer 102(2).

The method 300 continues on computer 102(2), where the encrypted email is received, as shown at block 314. At block 316, a user command is received (e.g., through entry into an email application executing on computer 102(2)) indicating that the user wants to view the encrypted email. In response to the command to view the email, at block 318 the email application checks for and discovers the hard-copy-only flag associated with the email. In response to the flag, as shown at block 320, the email application may display one or more messages to the user, including that the email is an encrypted email. The user may also receive a message that the encrypted email cannot be viewed on the computer screen and that the encrypted email is only viewable in hard copy form after it is printed on a secure printer.

At block 322, a query or challenge is sent to the printer designated by the encrypted email as the destination printer. The challenge is configured to confirm (or determine) whether the designated printer is an authorized, secure printer.

At block 324 of method 300, the printer receives the challenge and determines if the certificate from the TPM enabled printer is valid. At block 326, the printer sends a response back to the computer 102(2) indicating whether the certificate from the TPM enabled printer is valid.

On computer 102(2), if the certificate from the TPM enabled printer is not valid, the user is given a message indicating that the printer is not an authorized printer for printing the secure email, as shown at block 328. At block 330, if the certificate from the TPM enabled printer is valid, the encrypted email is sent to the secure printer, and the user is told to go to the secure printer to pick up the decrypted email.

The printer receives the encrypted email as shown at block 332, and decrypts the encrypted email at block 334. The printer decrypts the encrypted email using an unencrypted key from its own embedded TPM. After the email is decrypted, it is printed to a locked output bin of the printer, as shown at block 336.

The user then provides an authentication token to the printer as a means of identification. As shown at block 338, an identification reader on the printer reads the user ID from the authentication token. The authentication token may include, for example, a smart card, a finger printer, a retinal scan, a proximity device such as a Bluetooth cell phone, and so on. In another embodiment, unlocking the locked output bin and retrieval of the decrypted document may require more than one person to be authenticated. Thus, more than one authentication token may be read for user IDs at block 338. If the user ID (or IDs) is properly authorized, the output bin containing the decrypted, printed email may be unlocked by the printer to enable retrieval by the user (or users), as shown at block 340. In addition, however, there may be a retrieval time limit that requires the recipient to retrieve the decrypted email within a certain time frame. In this case, the recipient must provide properly authenticated identification prior to the expiration of the retrieval time limit in order to unlock the output bin and retrieve the decrypted email.

If the decrypted email is retrieved from the printer, a receipt may be sent back to the user who sent the email on computer 102(1), as shown at block 342. At block 344, the receipt is received on the sending computer 102(1) and helps to ensure that the delivery of the email cannot be repudiated. The receipt may include information such as the date and time the decrypted email was picked up, and what type of authentication token the recipient used for identification.

Figure 4:
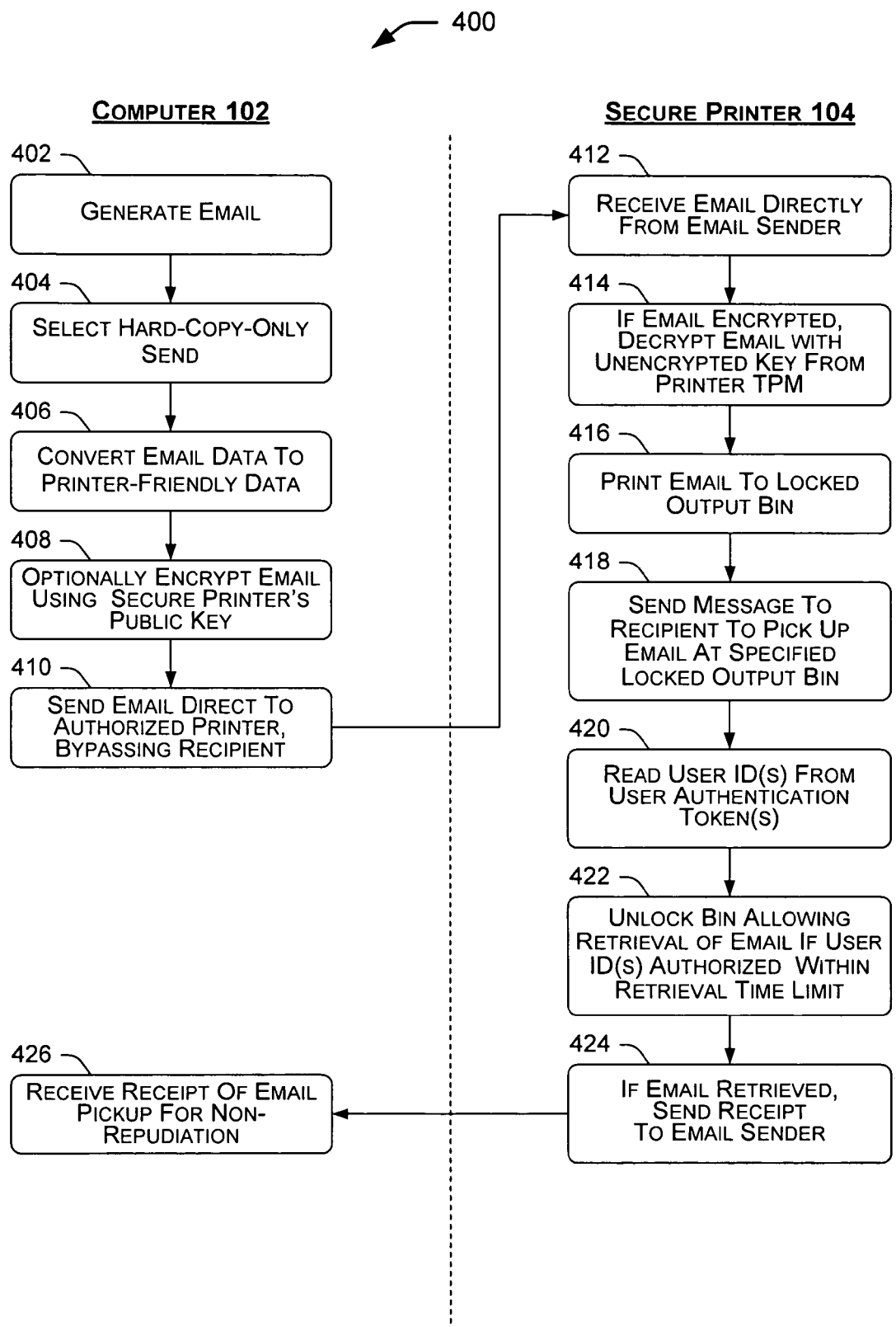

Another exemplary method 400, illustrated in FIG. 4, also relates to printing secure emails. The method is much the same as the prior method 300, with a few differences. Method 400 begins at block 402, with a user generating an email on a computer 102(1). At block 404, the user wants to send the email in a secure manner to a recipient and selects a "hard-copy-only" send option/command. As before, the hard-copy-only command ensures the sender that the recipient can only view the email as a hard-copy document printed on a secure printer.

As shown at block 406, the email is converted to a printer-friendly format, such as PostScript or printer control language (PCL), and at block 408, the email is optionally encrypted using a public key of the printer on which the email is designated to print. At block 410, rather than being sent to the intended recipient as in the prior method 300, the email is sent directly to the secure printer designated for printing the email.

The printer receives the email as shown at block 412. If the email is encrypted, it is decrypted as shown at block 414. The printer decrypts encrypted emails using an unencrypted key from its own embedded TPM. The email is then printed to a locked output bin of the printer, as shown at block 416. At block 418, the printer sends a message to the recipient of the email (e.g., a user on another computer), telling the user there is an email ready to be picked up in a specified locked output bin of the printer.

The user then provides an authentication token to the printer as a means of identification. As shown at block 420, an identification reader on the printer reads the user ID from the authentication token. The authentication token may include, for example, a smart card, a finger printer, a retinal scan, a proximity device such as a Bluetooth cell phone, and so on. As noted above, in another embodiment unlocking the locked output bin and retrieval of the decrypted document may require more than one person to be authenticated. Thus, more than one authentication token may be read for user IDs at block 420. If the user ID (or IDs) is properly authorized, the output bin containing the printed email may be unlocked by the printer to enable retrieval by the user (or users), as shown at block 422. In addition, however, there may be a retrieval time limit that requires the recipient to retrieve the email within a certain time frame. In this case, the recipient must provide properly authenticated identification prior to the expiration of the retrieval time limit in order to unlock the output bin and retrieve the email.

If the email is retrieved from the printer, a receipt may be sent back to the user who sent the email on computer 102, as shown at block 424. At block 426, the receipt is received on the sending computer 102 and helps to ensure that the delivery of the email cannot be repudiated. The receipt may include information such as the date and time the email was picked up, and what type of authentication token the recipient used for identification.

Figure 5:
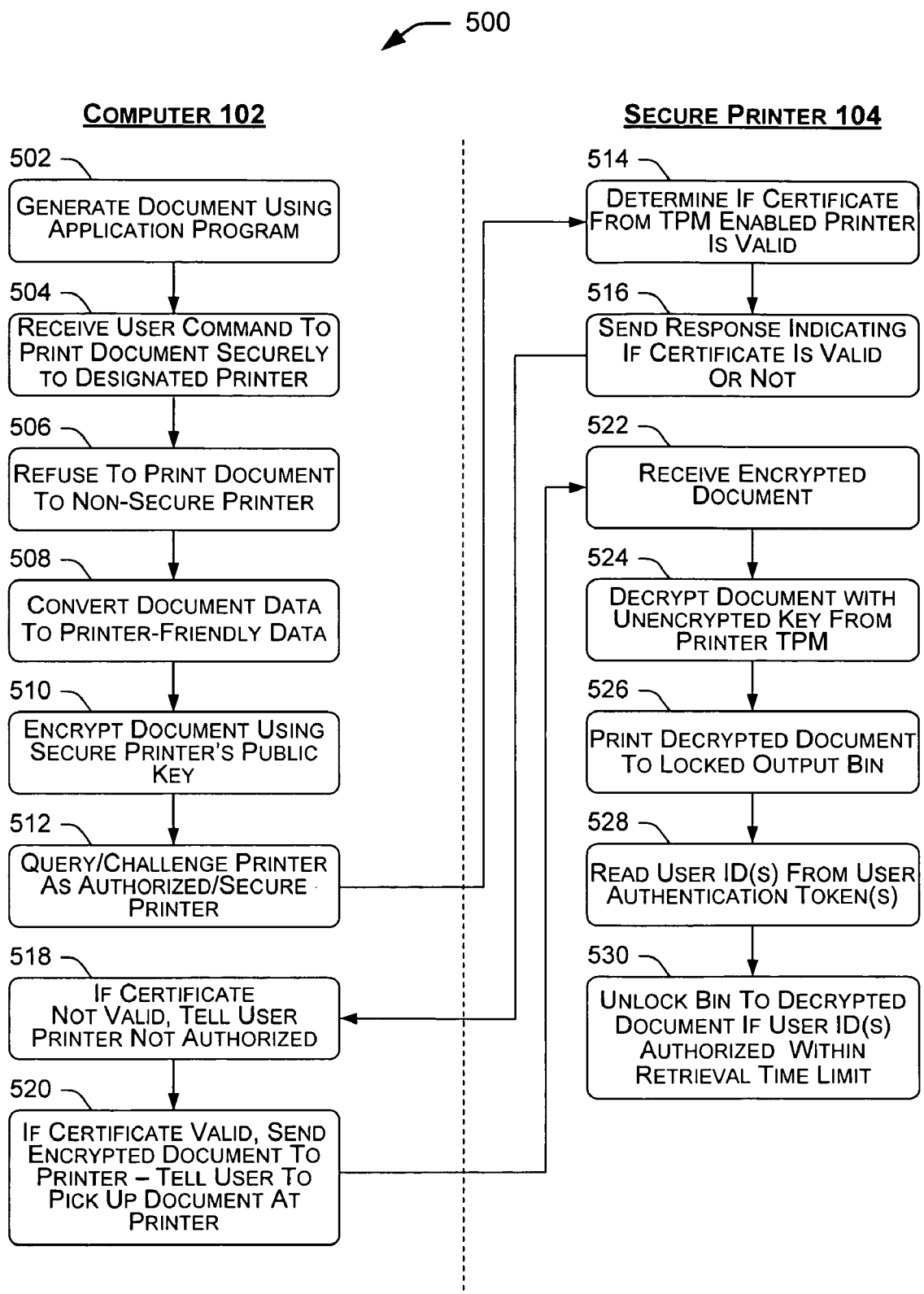

An exemplary method 500, illustrated in FIG. 5, relates to printing secure documents from various applications running on a computer. Exemplary method 500 begins at block 502, with a user at a computer 102 generating a document using an application program. The application program can be various types of application programs such as, word processing programs, spread sheet programs, and so on. At block 504, the user inputs a command, received by the application program, to print the document securely. The application can refuse to print the document if the printer designated for printing is not a secure printer, as shown at block 506.

In response to the secure print command, at block 508 the document is converted into printer-friendly data, such as PostScript or printer control language (PCL). At block 510 the document is encrypted using the secure printer's public key. The public key is a key from the TPM on computer 102. Another response to the secure print command is a query or challenge sent to the printer to determine if the printer is an authorized, secure printer, as shown at block 512.

At block 514, the printer receives the challenge and determines if the certificate from its own embedded TPM 228 is valid. At block 516, the printer sends a response back to the computer 102 indicating whether or not the certificate from its own embedded TPM 228 is valid.

The computer 102 receives the response and, if the certificate is not valid, it tells the user that the printer is not authorized to print the document in a secure manner on the designated printer, as shown at block 518. However, if the certificate is valid, the encrypted document is sent to the secure printer, and the user is instructed to go to the printer to pick up the document, as shown at block 520.

At block 522, the printer receives the encrypted document, and at block 524 it decrypts the document using an unencrypted key retrieved from the printer's embedded TPM. The decrypted document is then printed to one of a number of locked output bins of the printer, as shown at block 526. The user then provides an authentication token to the printer as a means of identification at block 528. At block 528, an identification reader on the printer reads the user ID from the authentication token. The authentication token may include, for example, a smart card, a finger printer, a retinal scan, a proximity device such as a Bluetooth cell phone, and so on. In another embodiment, unlocking the locked output bin and retrieval of the decrypted document may require the authentication of more than one person. Thus, more than one authentication token may be read for user IDs at block 528.

If the user ID (or IDs) is properly authorized, the output bin containing the decrypted document may be unlocked by the printer to enable retrieval by the user (or users), as shown at block 530. In addition, however, there may be a retrieval time limit that requires the recipient to retrieve the decrypted document within a certain time frame. In this case, the recipient must provide properly authenticated identification prior to the expiration of the retrieval time limit in order to unlock the output bin and retrieve the decrypted document.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for securely printing a document, comprising:
   receiving an encrypted document at a printer;
   decrypting the encrypted document using an unencrypted key from a trusted platform module (TPM) embedded in the printer;
   printing the decrypted document to one of a plurality of locked output bins;
   forwarding the decrypted document from the one of the plurality of locked output bins to a paper shredder if an intended recipient does not provide an authorized ID within a predetermined time limit.

2. A method as recited in claim 1, further comprising:
   reading an authentication token;
   determining if an ID (identification) from the authentication token is an authorized ID; and
   if the ID is an authorized ID, unlocking the one of the plurality of locked output bins, enabling the intended recipient to retrieve the decrypted document.

3. A method as recited in claim 2, wherein the reading comprises reading a plurality of authentication tokens, and the determining comprises determining if all of a plurality of corresponding IDs are authorized IDs.

4. A method as recited in claim 2, further comprising sending a receipt to confirm the decrypted document has been retrieved by the intended recipient.

5. A method as recited in claim 4, wherein the receipt is sent to a device which sent the encrypted document, and wherein the receipt includes information regarding the retrieval of the decrypted document, the information selected from the group comprising:
   a date and time the decrypted document was retrieved by the intended recipient; and
   a type of security token used to identify the intended recipient.

6. A method as recited in claim 2, wherein reading a security token comprises reading a security token selected from the group comprising: a smart card;
   an electronic badge;
   a fingerprint; and
   a retinal pattern.

7. A method as recited in claim 2, further comprising preventing the unlocking of the one of the plurality of locked output bins if the intended recipient does not provide an authorized ID within the predetermined time limit.

8. A method as recited in claim 1, further comprising:
   prior to receiving the encrypted document, receiving a challenge configured to confirm that the printer is an authorized secure printer; and
   in response to the challenge, authenticating the printer as an authorized secure printer by examining a certificate from the TPM embedded printer, or by looking at a TCG (Trusted Computing Group) integrity metrics response.

9. A method as recited in claim 8, wherein the challenge is received from a computer device that sends the encrypted document.

10. A method as recited in claim 1, wherein the encrypted document is an encrypted email received directly from a computer on which the encrypted email was generated.

11. A method as recited in claim 10, further comprising sending a message from the printer to a computer associated with an intended recipient of the email, the message indicating that an email can be picked up in a particular output bin of the printer.

12. A method as recited in claim 1, wherein the encrypted document is an encrypted email generated at a first computer, sent to a second computer, and received at the printer from the second computer.

13. A method as recited in claim 1, wherein the encrypted document is an encrypted email that has an associated hardcopy-only flag, the flag configured to prevent an intended recipient from viewing the encrypted email as an unencrypted email in any form other than a hard-copy form.

14. A method of secure printing comprising:
receiving an encrypted email;
receiving a user command to open the encrypted email;
determining that the encrypted email has an associated hard-copy-only flag;
based on the flag, sending the encrypted email to a secure printer in response to the command;
printing the decrypted document on the secure printer and thereafter sending the decrypted document to a paper shredder if an intended recipient does not pick up the decrypted document within a predetermined time limit.

15. A method as recited in claim 14, further comprising providing a message to the user that the email is encrypted and can be viewed in hard-copy only form after printing on the secure printer.

16. A method as recited in claim 14, further comprising, prior to sending the encrypted email, authenticating the secure printer through a TPM (Trusted Platform Module) embedded in the secure printer.

17. A method of sending a secure document comprising:
generating an email;
receiving a user command to send the email as hard-copy-only email;
setting a flag in the email in response to the user command, the flag configured to prevent an intended recipient from viewing the email in an electronic form and to ensure that the intended recipient can only view the email in hard-copy form after printing on a secure printer; and
printing the decrypted document on the secure printer and thereafter sending the decrypted document to a paper shredder if the intended recipient does not pick up the decrypted document within a predetermined time limit.

18. A method as recited in claim 17, further comprising:
sending a challenge to the secure printer configured to verify that the secure printer is an authorized secure printer for printing the email; and
receiving a valid certificate from a TPM (Trusted Platform Module) embedded in the secure printer, the valid certificate verifying that the secure printer is an authorized secure printer for printing the email.

19. A method as recited in claim 18, further comprising sending the email directly to the secure printer.

20. A method as recited in claim 19, further comprising, prior to sending the email, encrypting the email using a public key from the TPM of the secure printer.

21. A method as recited in claim 17, further comprising:
encrypting the email using a public key from a TPM (Trusted Platform Module) embedded in the secure printer; and
sending the encrypted email to a computer associated with the intended recipient.

22. A method as recited in claim 21, further comprising receiving a receipt from the secure printing indicating that the intended recipient has retrieved the email.

23. A method as recited in claim 22, wherein the receipt includes information selected from the group comprising:

a date on which the email was retrieved;
a time when the email was retrieved; and
a type of authentication token used by to retrieve the email.

24. A printer comprising a TPM (Trusted Platform Module) configured to verify the printer as an authorized secure printer, the printer to decrypt an encrypted document to generate a decrypted document, to print the decrypted document to one of a plurality of locked output bins, and to send the decrypted document from the one of plurality of locked output bins to a paper shredder if an intended recipient does not pick up the decrypted document within a predetermined time limit.

25. A printer as recited in claim 24, further comprising a decryption/authentication module configured to retrieve an unencrypted key from the TPM and decrypt the encrypted document using the unencrypted key.

26. A printer as recited in claim 25, further comprising a plurality of locked output bins for receiving deencrypted printed documents.

27. A printer as recited in claim 26, further comprising an ID (identification) reader configured to read an ID from an authentication token and to open a locked output bin permitting retrieval of the decrypted document that has been printed upon verification of an authorized ID.

28. A printer as recited in claim 27, wherein the printed document is an email message, the printer further comprising an application configured to send a receipt to a sender of the email message verifying that the email has been retrieved.

29. A system comprising:
a printer;
an email application on a first computer configured to generate an email and send the email with a hard-copy-only flag; and
an encryption/authentication module on the first computer configured to encrypt the email using a public key of the printer's embedded TPM (Trusted Platform Module), the encryption/authentication module further configured to authenticate the printer as a secure printer through a certificate of the printer's embedded TPM,
wherein the printer is to decrypt the encrypted email to yield a decrypted email, to print the decrypted email, and to send the decrypted email to a paper shredder if an intended recipient does not pick up the decrypted email within a predetermined time limit.

30. A system as recited in claim 29, further comprising a second email application on a second computer configured to prevent a user from viewing the encrypted email and to send the encrypted email to the secure printer based on the hard-copy-only flag.

31. A system as recited in claim 29, further comprising an application program on the first computer configured to generate a document and flag the document to ensure that the document can only be printed on a secure printer.

32. A system as recited in claim 31, wherein the application program prohibits sending a document to any device except to a secure printer, regardless of the document type.

* * * * *

UNITED STATES PATENT AND TRADEMARK OFFICE
CERTIFICATE OF CORRECTION

| | | |
|---|---|---|
| PATENT NO. | : 7,620,177 B2 | Page 1 of 1 |
| APPLICATION NO. | : 11/263475 | |
| DATED | : November 17, 2009 | |
| INVENTOR(S) | : Ibrahim et al. | |

It is certified that error appears in the above-identified patent and that said Letters Patent is hereby corrected as shown below:

In column 13, line 10, in Claim 14, after "command;" insert -- and --.

Signed and Sealed this

Ninth Day of November, 2010

David J. Kappos
*Director of the United States Patent and Trademark Office*